Sept. 18, 1934.  W. J. WALKER  1,974,382
BAG FRAME AND FASTENER THEREFOR
Filed July 8, 1931
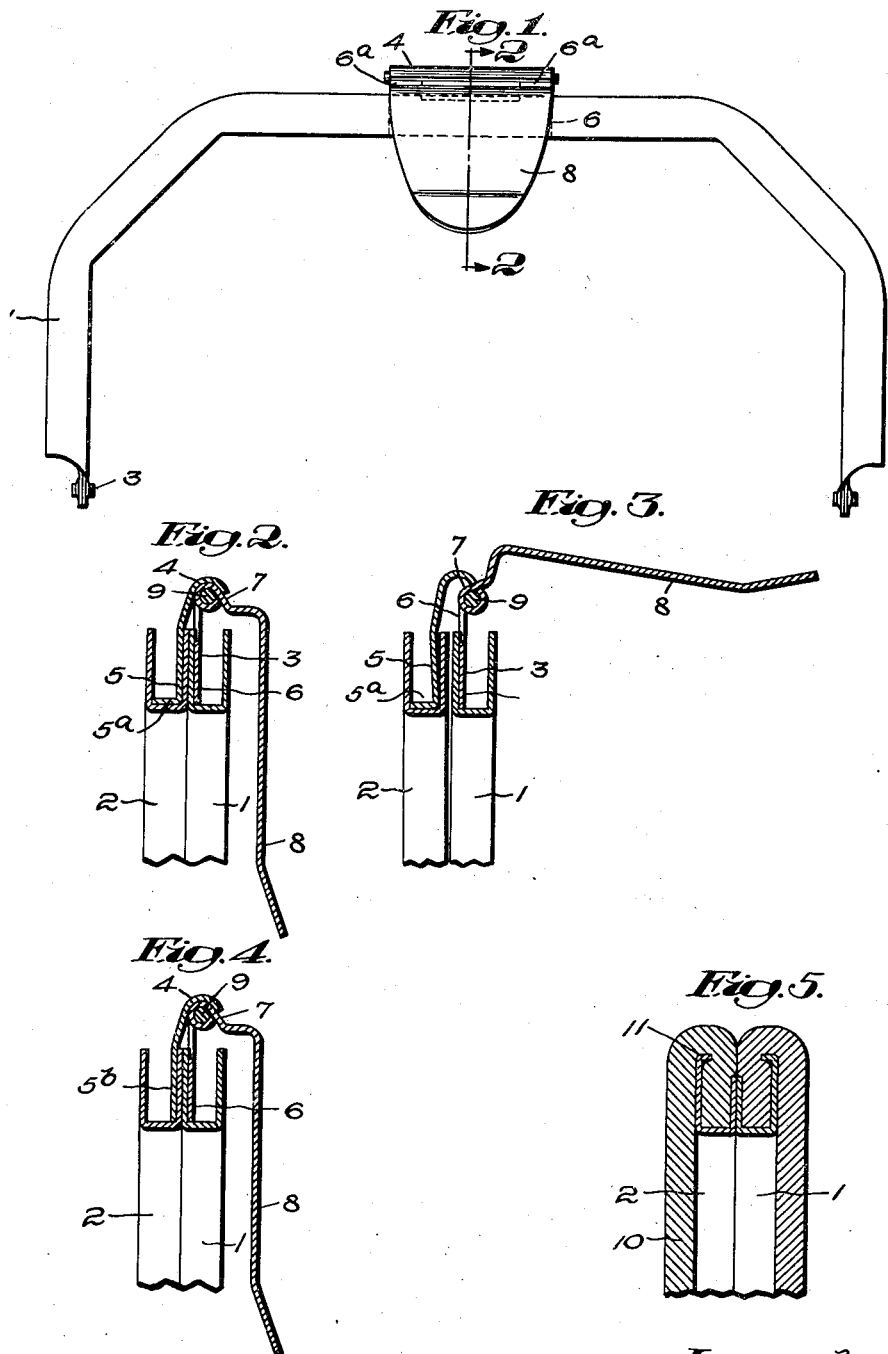
Inventor:
William J. Walker Patented Sept. 18, 1934

1,974,382

UNITED STATES PATENT OFFICE 1,974,382

BAG FRAME AND FASTENER THEREFOR

William J. Walker, Hillside, N. J., assignor to United-Carr Fastener Corporation, Cambridge, Mass., a corporation of Massachusetts Application July 8, 1931, Serial No. 549,367

2 Claims. (Cl. 150—29)

My invention aims to provide improvements in bag frames and fasteners for the same.

In the drawing which illustrates preferred embodiments of my invention:—

Figure 1 is an elevational view of an improved form of bag frame structure and fastening means for the same;

Fig. 2 is an enlarged section taken on the line 2—2 of Fig. 1, showing the fastener and bag frame members in closed positions;

Fig. 3 is a section similar to that shown in Fig. 2, but showing the manner of unlocking the fastening means;

Fig. 4 is a section of a bag frame structure similar to that shown in Fig. 2, but showing a hook member secured to the inner wall of one of the frame members; and Fig. 5 is a section through any other form of bag frame structure taken at one side of the fastening means.

My invention, as illustrated by the drawing, is particularly, though not exclusively, adapted for use in connection with ladies' hand-bags and is directed particularly to improvements in fastenings for hand-bags, although in Fig. 5 I have illustrated an improvement in the bag frame structure per se.

Referring first to the particular embodiment of my invention illustrated in Figs. 1 through 3, I have shown a pair of U-shaped frame members 1 and 2 secured together at their free ends by rivets 3, or other suitable fastenings which will permit the frame members to be hinged for movement of one relative to the other. The frame members 1 and 2 which I have selected for illustration and description are U-shaped in cross-section with the open ends of the U facing outwardly (Figs. 2 and 3) although it should be understood that my improved separable fastening means for holding the two frame members in locked positions may be used with frame members of other cross-sections variously arranged, as will be understood by those skilled in the art.

The particular separable fastening means which I have illustrated in Figs. 1 through 3 comprises a member which has a hook-shaped portion 4 at one end and an L-shaped portion 5 at the other end. This member is secured to the U-shaped frame member 2 (Figs. 2 and 3) in such a manner that the L-shaped portion is located between the walls of the U-shaped cross-section and secured in positoin by welding or otherwise rigidly securing the bottom portion 5a of the L-shaped portion to the bottom of the U-shaped portion of the frame. The upwardly extending portion of the L-shaped portion 5 lies adjacent to the inner wall of the U, but is free to move relative thereto for purposes hereinafter described. The other fastening member comprises a hinge member 6 which may be secured to the frame member 1 in the same manner as the hook member is secured to the frame member 2. However, for the purposes of illustration I have shown the hinge member 6 secured directly, as by welding, to the inner wall of the U-shaped frame member 1, as best illustrated in Figs. 2 and 3. The hinge member 6 has ears 6a (Fig. 1) at opposite ends thereof and between them is located a cam portion 7 of a pivotally movable tab 8. The pivotally movable tab 8 is held in position between the ears 6a—6a by a suitable pin 9 which passes through all three of the elements. The tab 8 extends outwardly and downwardly a substantial distance over the outer face of the frame member 1, thereby providing a suitable and conveniently located element to provide the proper leverage for operation of the cam member 7.

In the normal operation of the fastening means which I have just described, if we assume that the hook portion 4 is engaged over the cam portion 7, as shown in Fig. 2, it is merely necessary to lift the tab 8 from a position shown in Fig. 2 to a position shown in Fig. 3. This action causes the cam portion 7 to engage the edge of the hook portion 4 and force it away from the cam portion, thereby releasing the two members and permitting pivotal movement of the frame members 1 and 2 for access between them. During this unlocking operation the member which provides the hook portion 4 yields in a manner shown in Fig. 3. To secure the frame members 1 and 2 together it is merely necessary to press one toward the other without manipulation of the tab 8, because the edge of the hook portion 4 will engage and ride over the rounded portion which is presented by the ears 6a—6a and the cam portion 7. Therefore, it will be readily understood that I have provided a fastening means which may be termed a snap fastening means because it has a snap action for engagement of the elements.

In Fig. 4 I have illustrated a device which is substantially identical with that illustrated in Figs. 1 through 3. The only difference is in the manner of attachment of the member which presents the hook portion 4. In this instance I have omitted the L-shaped portion 5 and provided merely a straight wall portion 5b which is welded, or otherwise secured directly to the inner wall of the frame member 2. With this construction most of the yielding action takes place between the frame members 1 and 2 to permit separation of the hook portion 4 from the cam portion 7.

In Fig. 5 I have illustrated an improved frame structure of the U-shaped cross-section type where the material 10 of the bag is wrapped over the outer wall of each of the frame members 1 and 2 with the free edges gripped between both of the walls of the frame members. With this type of construction I have found that a more pleasing appearance can be secured by providing flange means 11 extending inwardly from the upper edge of the outer wall of each frame member, because these flanges project the material 10 in such a manner that it overhangs the inner wall which, in order to carry out my invention, has been made shorter than the outer wall, as clearly illustrated in Fig. 5. Therefore, when the frame members are secured together by the fastening means substantial portions of the bag material 10 engage above the inner walls and are compressed against each other so that none of the bag frame structure is exposed when the installation is complete.

While I have illustrated and described preferred embodiments of my invention I do not wish to be limited thereby, because the scope of my invention is best defined by the following claims.

1. A bag frame structure including a pair of frame members hinged to each other at their ends and separable fastening means for holding said frame members together, said separable fastening means comprising a hook-shaped member and a hinged tab member, one of said frames being U-shaped in cross-section with the open end of the U facing upwardly and said hook-shaped member having an L-shaped portion the bottom of which is rigidly secured to the bottom of the U-shaped frame member and the remaining portion being free to yield relative to the U-shaped frame member when being engaged with and disengaged from a cam portion provided as a part of the hinged tab.

2. A bag frame structure including a pair of frame members hinged to each other at their ends and separable fastening means for holding said frame members together, each of said frame members having one member of the separable fastening means secured thereto and one of the members of said separable fastening means having an L-shaped portion, the bottom portion of which is secured directly to one of the frame members, and the side portion of the L-shaped portion being free to yield relative to an adjacent side of the frame member to which it is attached, thereby to permit engagement and disengagement of the members of the separable fastening means.

WILLIAM J. WALKER.